(12) United States Patent
Flarup-Knudsen

(10) Patent No.: US 6,935,855 B2
(45) Date of Patent: Aug. 30, 2005

(54) APPARATUS FOR EXTRUSION OF WATER-CONTAINING PRODUCTS

(75) Inventor: Anders Flarup-Knudsen, Esbjerg (DK)

(73) Assignee: Sprout-Matador A/S, Esbjerg (DK)

( * ) Notice: Subject to any disclaimer, the term of this patent is extended or adjusted under 35 U.S.C. 154(b) by 219 days.

(21) Appl. No.: 10/221,793

(22) PCT Filed: Mar. 13, 2001

(86) PCT No.: PCT/DK01/00200

§ 371 (c)(1), (2), (4) Date: Nov. 14, 2002

(87) PCT Pub. No.: WO01/72153

PCT Pub. Date: Oct. 4, 2001

(65) Prior Publication Data

US 2003/0185924 A1 Oct. 2, 2003

(30) Foreign Application Priority Data

Mar. 24, 2000 (DK) ........................................ 2000 00502

(51) Int. Cl.$^7$ ................................................ B28B 9/06
(52) U.S. Cl. .................... 425/4 C; 425/377; 425/192 R; 425/72.1; 425/326.4; 425/313
(58) Field of Search ................................. 425/4 C, 4 R, 425/149, 6, 377, 192 R, 325, 72.1, 308, 326.1, 310, 311, 313; 426/448, 511

(56) References Cited

U.S. PATENT DOCUMENTS 5,272,718 A * 12/1993 Stenzel et al. ................ 373/22
6,318,123 B1 * 11/2001 Edlinger ........................ 65/19

* cited by examiner

*Primary Examiner*—Joseph S Del Sole
(74) *Attorney, Agent, or Firm*—Stites & Harbison PLLC; Douglas E. Jackson

(57) ABSTRACT

The inventions relates to an extrusion apparatus suited for water-containing products which heat-expand by internal boiling of water by pressure relief after passing through extrusion nozzles. The apparatus comprises a) an extruder, which at the outlet end thereof comprises a nozzle plate, b) a pressure-controlling chamber for controlling the pressure on the outlet side of the nozzle plate, said pressure-controlling chamber possibly containing a cutting-off unit, and c) a sluice unit downstream of the pressure controlling chamber. The apparatus furthermore comprises that the pressure-controlling chamber and sluice unit being releasably interconnected and at least the sluice unit being mounted movably in and out of the product stream. Hereby may the apparatus start up without connecting the sluice and easily connecting the sluice, when the product is sufficiently stable for the correct function of the sluice, so that the problems during start-up of the apparatus, such as the unstable and the relatively wet products tendency of blocking the sluice is substantially avoided.

9 Claims, 3 Drawing Sheets

APPARATUS FOR EXTRUSION OF WATER-CONTAINING PRODUCTS

TECHNICAL FIELD

The present invention relates to an extrusion apparatus of the kind suited for water-containing products which heat-expand by internal boiling of water by pressure relief after passing through extrusion nozzles.

An apparatus of this kind is e.g. known from WO 99/62361 by the present Applicants. Such apparatus is suited for extrusion of expanding water-containing products such as foodstuff articles or feedstuff pellets of various kinds. In order to be able to control the expansion of the product when leaving the extrusion nozzles in the nozzle plate, the apparatus comprises a pressure-controlling chamber. By controlling the pressure in this chamber, the expansion of the product can be adjusted in accordance with desired parameters. In order to be able to control the pressure of the pressure-controlling chamber, the product will have to leave this chamber through a sluice mounted downstream of said chamber. On the outlet side of the sluice, the pressure will be atmospheric pressure or possibly a slight vacuum, used for transporting the produced product. When using such an apparatus it has been found that especially during start-up the product may be unstable and possibly relatively wet whereby the produced product during start-up is soft and has a tendency of blocking the sluice, necessitating dismounting of several components in order to clean the sluice.

DISCLOSURE OF THE INVENTION

It is the object of the present invention to provide an apparatus of the kind referred to above, with which it is possible to alleviate these problems and with which further improvements are possible, and this object is achieved with an apparatus of said kind. With this arrangement, it is made possible to start up the machinery without connecting the sluice and easily connecting the sluice, when the product is sufficiently stable for the correct function of the sluice. Advantageous embodiments of the invention are also revealed hereafter and the advantages thereof will be evident from the following detailed description. These advantages comprise among others a simple, fast change between different working conditions, easy disassembly for cleaning e.g. when changing product, and easy control of product stability during start-up, before connecting the sluice.

These advantages comprise among others a simple, fast change between different working conditions, easy disassembly for cleaning e.g. when changing product, and easy control of product stability during start-up, before connecting the sluice.

BRIEF DESCRIPTION OF THE DRAWINGS

In the following detailed part of the present description, the invention will be explained in more detail with reference to the exemplary embodiments of an extrusion apparatus in accordance with the invention shown in the drawings, in which FIG. 1 schematically shows a cross-section of the parts of an extrusion apparatus which are of importance for the present invention.

DESCRIPTION OF THE PREFERRED EMBODIMENTS

Figure 1:
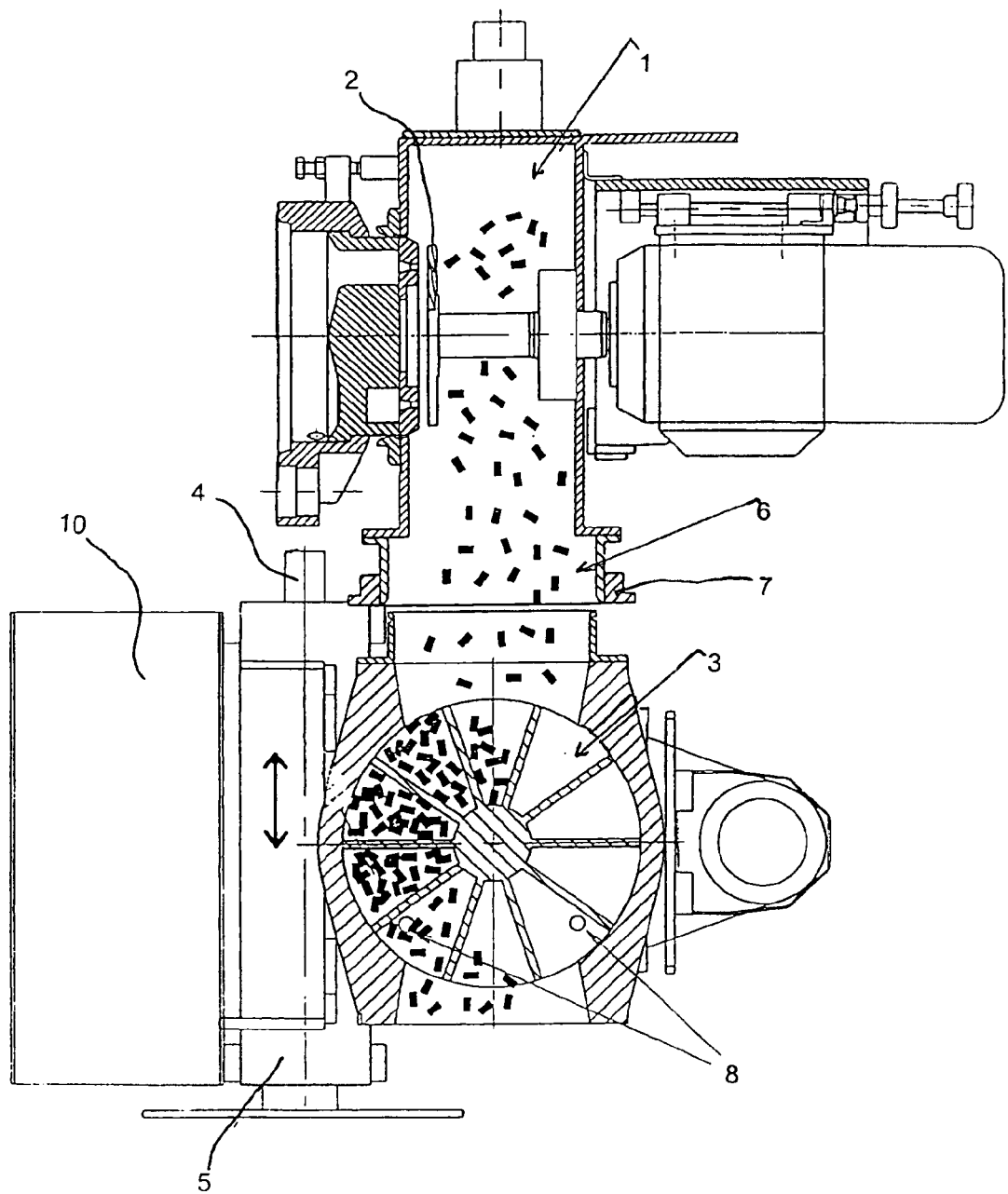
Figure 2:
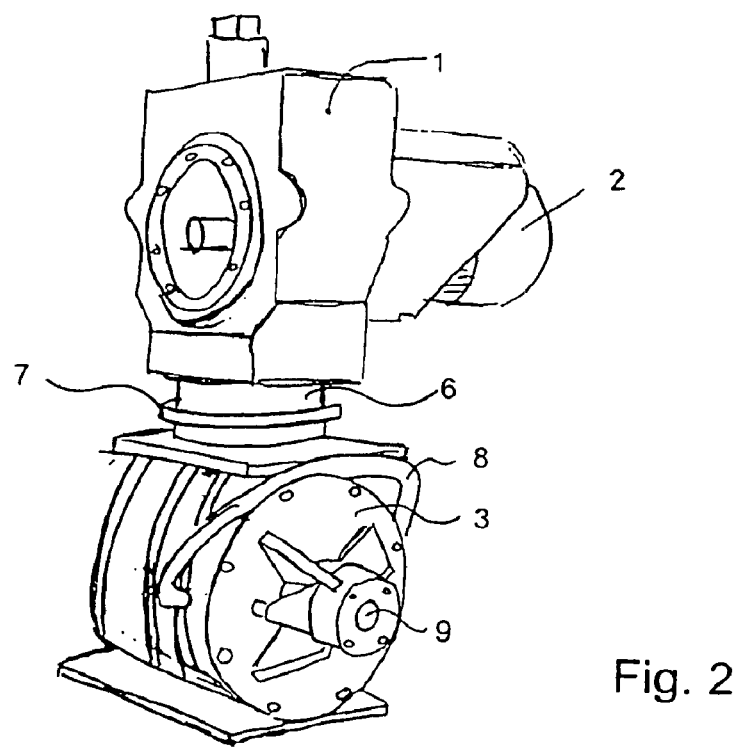
FIGS. 2 and 3 show perspective views of the parts shown in FIG. 1 seen from different directions, and FIG. 4 schematically show the embodiment shown in FIG. 1 with a part of an extruder.
Figure 3:
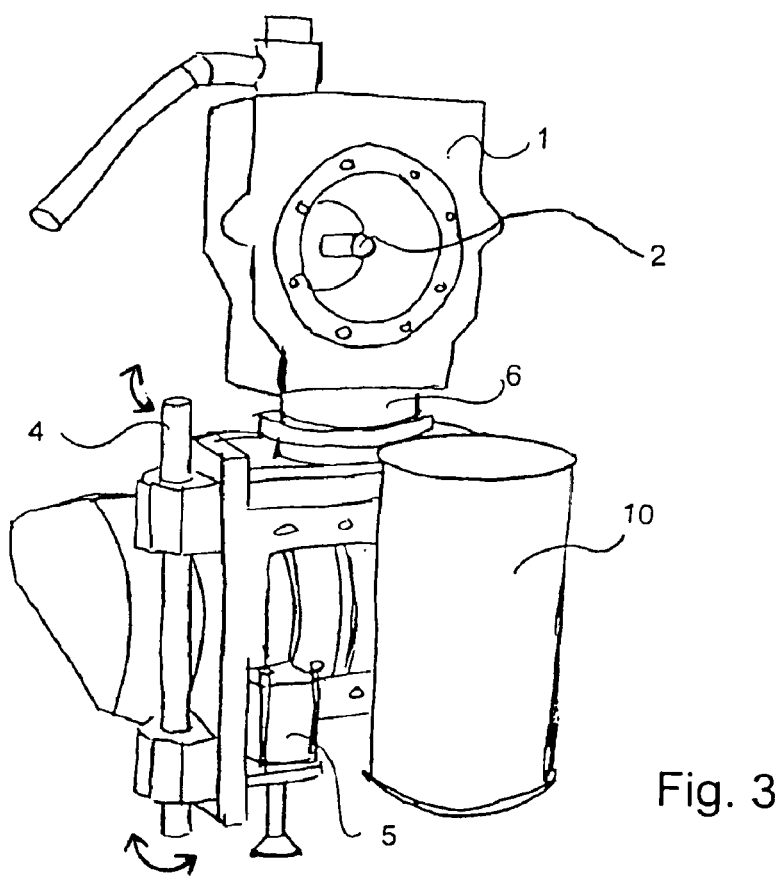
Figure 4:
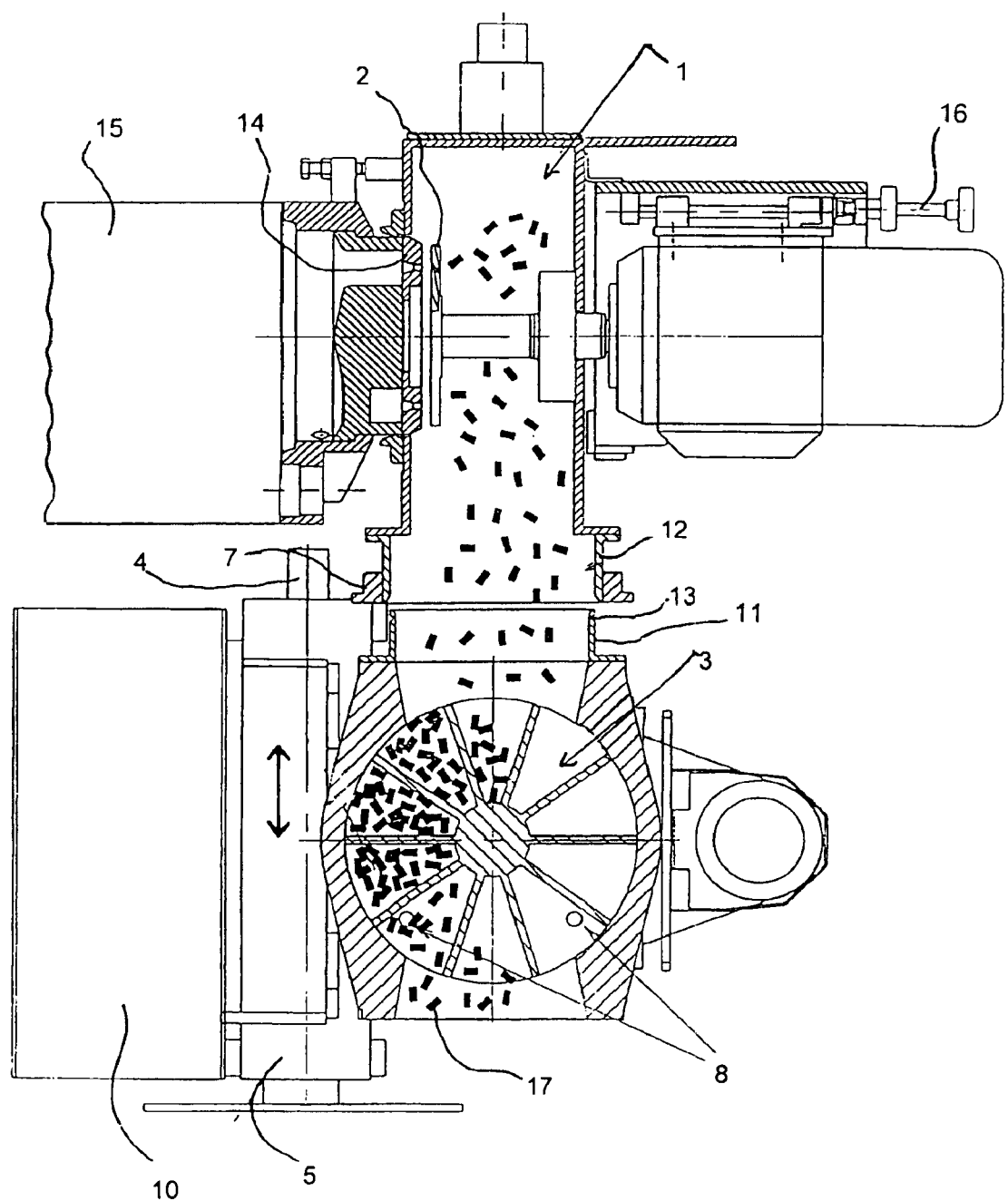

The extrusion apparatus shown in FIG. 1 and FIG. 4 is of the kind well-known to a man skilled in the art and the details of the extrusion process will not be dealt with here as those are well-known e.g. from WO 99/62361.

The apparatus shown comprises an extruder 15 which exposes the product 17 to a high extrusion pressure and a correspondingly high temperature, from which the product 17 is discharged into the pressure-controlling chamber 1 through a nozzle plate 14. The product 17 leaving the nozzles of the nozzle plate 14 is cut off by a cutting-off system comprising a rotary knife 2, whereby the size of the pellets produced can be controlled by controlling the speed of the rotating knife in correspondence with the speed of the extrusion of the product out through the nozzle plate 14. For certain products, the cutting-off system is not needed due to the self-disintegrating properties of the extruded products.

The pressure-controlling chamber 1 is connected to the extruder 15 and nozzle plate 14 in a pressure-tight way and this connection is provided in a releasable way so that the pressure-controlling chamber 1 can be moved out of the way of the extruder 15 and nozzle plate 14 in order to facilitate cleaning and possibly start up without connecting the pressure-controlling chamber 1. In the embodiment shown in FIG. 1 and FIG. 4, the pressure-controlling chamber 1 is mounted swingably on an axis 4 so that the chamber can be swung away from the nozzle plate 14.

Downstream of the pressure-controlling chamber 1, the apparatus comprises a sluice 3 of a well-known kind comprising several sluice chambers which by rotation are successively connected first to receive product from the pressure-controlling chamber 1 and later to expel product for further conveyance. The sluice 3 in the embodiment shown is also mounted swingably around the same axis 4 as the pressure-controlling chamber 1 and these are thus movable together in their mutually connected condition. As an alternative, the sluice 3 can be disconnected from the pressure-controlling chamber 1, the connection between the chamber and sluice being provided by one tube 11 sliding inside another 12 and provided with O-ring sealing 13 and the mechanical connection being provided by means of a bayonet connection 7 or similar manually releasable connection. For the releasing of the sluice 3 from the chamber 1, the sluice 3 is moved downwards, possibly sliding on the swing axes 4, whereafter the sluice can swing out of the way. In the embodiment shown in FIG. 1 and FIG. 4, the swinging away of the sluice 3 will provide the swinging-in to the process stream of a bypass duct 10 which will guide the product 17 from the pressure-controlling chamber 1 further onwards in the product stream. When the product is transported through the bypass duct 10, no possibilities are present for controlling the pressure in the pressure-controlling chamber 1, as this bypass duct 10 does not contain any means for restricting flow of gas. In this situation, the extrusion apparatus operates with expansion into atmospheric pressure or possibly a slight vacuum present in the transport system after the bypass duct 10.

In order to facilitate the movement up and down of the sluice 3, when connecting and disconnecting from the pressure-controlling chamber 1, the embodiment shown in FIG. 1 and FIG. 4 comprises a spring system 5 supporting the sluice 3 and bypass duct 10 so that the manual connection/disconnection of the sluice chamber 3 will not necessitate the lifting of the whole weight of the sluice 3 and bypass duct 10 which are in this way so to say weightlessly supported by the spring system 5. The spring system 5 may be provided in the form of a gas spring or an ordinary helical spring.

In the embodiment shown in FIG. 1 and FIG. 4, a further feature is shown, namely the adjustment of the cutting-off system with the rotating knife 2, which is provided by means of adjustment screws 16 moving the motor and the rotating knife in a axial direction, said screws 16 being provided on the outside of the pressure-controlling chamber 1. By means of these adjustment screws 16 the distance between the knife 2 and the nozzle plate 14 can be adjusted to optimise the cutting function of the knife 2.

Furthermore, the embodiment shown in FIG. 1 and FIG. 4 comprises a pressure-relief channel 8 mounted on the sluice 3, said channel 8 connecting a chamber in the sluice which is moving out of the controlled pressure zone with a chamber which is moving into the controlled pressure zone, thereby transferring a partially controlled pressure to the latter, whereby a reduced leakage through the sluice can be obtained with the associated advantages. These advantages are among others that a higher pressure can be achieved in the pressure-controlling chamber, whether using steam from the extrusion process or compressed air added to the pressure-controlling chamber 1. Naturally, corresponding advantages will be achieved also when used vacuum in the pressure-controlling chamber.

In FIG. 4 is furthermore schematically shown the extruder 15 in front of the nozzle plate 14. The extruder 15 used according to the invention may be all known types of extruders, such as for instance single-worm, double-worm, dry extruders, cooking extruders with/without preconditioning, etc.

Although the invention above has been described in connection with a preferred embodiment of the invention, it will be evident for a man skilled in the art that several modifications are conceivable without departing from the invention as defined by the following claims. Such modifications comprising e.g. movement of the pressure-controlling chamber and/or the sluice on rails in a sliding movement, possible use of pneumatic, hydraulic or motor-driven actuators for the movement and/or locking of the different components.

What is claimed is:

1. Extrusion apparatus suited for water-containing products which heat-expand by internal boiling of water by pressure relief after passing through extrusion nozzles, comprising
    a) an extruder, which at an outlet end thereof comprises a nozzle plate having extrusion nozzles through which a product stream is extruded,
    b) a pressure-controlling chamber capable of controlling the pressure on the outlet side of the nozzle plate to which the product stream is subjected, and
    c) a sluice unit downstream of the pressure controlling chamber through which the product passes, characterized by an interconnection by which the pressure-controlling chamber and sluice unit are releasably interconnected and by a movement mechanism by which at least the sluice unit is mounted movably in and out of the product stream.

2. Extrusion apparatus in accordance with claim 1, characterized by said releasable interconnection being releasable without the use of tools.

3. Extrusion apparatus in accordance with claim 1, characterized by further comprising a releasable connection between the pressure chamber and the extruder, whereby these are capable of being separated and moved independent of each other.

4. Extrusion apparatus in accordance with claim 3, characterized by comprising a bypass system, said bypass system capable of being inserted instead of the sluice unit when the sluice unit is removed from the outlet of the pressure-controlling chamber, whereby the product stream is capable of being transferred further on in the system in a controlled manner.

5. Extrusion apparatus in accordance with claim 1, characterized by comprising weightless means for offsetting the weight of the sluice unit thereby facilitating the releasing and connection of the sluice unit to the pressure-controlling chamber.

6. Extrusion apparatus in accordance with claim 1, characterized by comprising a locking arrangement between the pressure-controlling chamber and the sluice unit, said locking arrangement securing a pressure-tight connection between the two components and said locking arrangement being releasable without the use of tools.

7. Extrusion apparatus in accordance with claim 1, characterized by the sluice unit comprising a pressure equalization channel for transferring part of the pressure in sluice chambers containing product and having a pressure corresponding to the pressure in the pressure-controlling chamber, to sluice chambers at atmospheric pressure moving towards the pressure-controlling chamber for receiving product.

8. Extrusion apparatus in accordance with claim 1, wherein said pressure-controlling chamber contains a cutting-off unit for the product which exits said nozzle plate.

9. Extrusion apparatus in accordance with claim 8, in which the cutting-off unit is adjustable from the outside of the pressure-controlling chamber.

* * * * *

UNITED STATES PATENT AND TRADEMARK OFFICE
CERTIFICATE OF CORRECTION

PATENT NO. : 6,935,855 B2
DATED : August 30, 2005
INVENTOR(S) : Flarup-Knudsen

It is certified that error appears in the above-identified patent and that said Letters Patent is hereby corrected as shown below:

<u>Title page,</u>
Item [22], PCT Filed, change "PCT Filed: March 13, 2001" to -- PCT Filed: March 23, 2001 --.

Signed and Sealed this

Second Day of May, 2006

JON W. DUDAS
*Director of the United States Patent and Trademark Office*